United States Patent [19]

Lear et al.

[11] Patent Number: 5,194,549
[45] Date of Patent: Mar. 16, 1993

[54] COATING COMPOSITION AND POLYMER FOR USE THEREIN

[75] Inventors: Peter Lear, Amsterdam; Gerardus C. Overbeek, Sprang-Capelle, both of Netherlands

[73] Assignee: ICI Resins BV, Waalwijk, Netherlands

[21] Appl. No.: 725,321

[22] Filed: Jul. 8, 1991

[30] Foreign Application Priority Data

Jul. 11, 1990 [GB] United Kingdom ................ 9015254
May 29, 1991 [GB] United Kingdom ................ 9111558

[51] Int. Cl.$^5$ .................. C08F 120/54; C08F 120/10; C08G 18/00; C08G 63/02; C08G 69/26
[52] U.S. Cl. .................. 526/303.1; 526/328; 528/44; 528/272; 528/335; 524/561; 428/520
[58] Field of Search ...................... 526/303.1

[56] References Cited

U.S. PATENT DOCUMENTS 3,676,391 7/1972 De Ross ........................... 525/222
4,507,342 3/1985 Kielbania, Jr. ..................... 428/90

*Primary Examiner*—Joseph L. Schofer
*Assistant Examiner*—Wu C. Cheng
*Attorney, Agent, or Firm*—Cushman, Darby & Cushman

[57] ABSTRACT

Film-forming coating composition for application to a polypropylene substrate, which comprises a polypropylene-adherable polymer P which has a polymer backbone having pendant and/or terminal groups which comprise a moiety of formulae

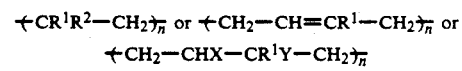

where n is 2 to 500; $R^1$ is alkyl of 1 to 3 carbon atoms, $R^2$ is H or an alkyl or alkenyl group of 1 to 3 carbons, and X is H or halogen and Y is H or halogen. Typically $R^1$ is methyl, $R^2$ is H, and X and Y are H. The composition optionally includes a filmogenic polymer Q, different to P.

49 Claims, No Drawings

COATING COMPOSITION AND POLYMER FOR USE THEREIN

The present invention relates to a film-forming coating composition for application to a polypropylene substrate, and to a polymer for use therein.

The use of polypropylene, either as the pure plastics material or in a rubber-toughened form, has become widespread for a large number of applications because of the excellent general properties of the material coupled with its relatively low price compared with other structural materials of equivalent performance. In particular, polypropylene has become the polymer of choice in the manufacture of various external and internal automobile parts, such as bumpers, side mirror supports, interior panels and door handles. When employing such polypropylene articles, it is often desirable to overcoat the basic substrate to achieve, for example, a protective and/or decorative coating, such as a paint coating, or an adhesive coating for subsequent bonding to another substrate.

Unfortunately, because polypropylene possesses a low surface tension (making initial film-formation thereon difficult) and a low polarity, it is difficult to ensure that an applied coating (derived from a coating composition) adheres effectively to the surface of the polypropylene article.

One approach that has been employed for solving this problem has been to apply a physical treatment, such as an electrical discharge, to the polypropylene so as to provide a polar surface. However, this technique tends to cause a deterioration in bulk physical properties.

Another approach has been to employ solvent-born chlorinated polyolefines's (CPO's) to prime the polypropylene, the CPO being used alone or in conjunction with a filmogenic polymer, such as an acrylic polymer or a urethane polymer, in the primer paint composition. CPO's will in fact adhere effectively to a polypropylene surface providing the level of chlorination therein is not too high; the presence of chlorine is necessary to allow solubility in the commonly used paint solvents such as toluene and xylene. Nevertheless, the use of CPO's suffers from a number of disadvantages: the CPO is poorly compatible with common filmogenic polymers such as acrylics and urethanes so that unwanted separation of the components of the primer composition may occur on storage; the CPO has poor outdoor durability; there is a tendency for the CPO to redissolve in the solvents of additionally applied coatings, causing delamination; there is an occasional tendency for the CPO to dehydrochlorinate; and the presence of chlorine in the CPO precludes its use in applications where food is involved, e.g. as in the adherence of aluminium foil tops to polypropylene yoghurt cups.

We have now devised an entirely fresh solution to the problem of ineffective adherence to a polypropylene substrate which does not necessarily require the use of a chlorinated polymer such as CPO, or the need to physically pretreat the polypropylene. It may also be possible, in some cases, not to use organic solvents by employing aqueous-based compositions. We have achieved this solution by the use of a novel and useful coating composition.

According to the present invention there is provided a film-forming coating composition for application to a polypropylene based substrate, which coating composition comprises at least one polypropylene-adherable polymer P which has a polymer backbone having pendant and/or terminal groups which comprise a moiety (i.e. a sub-group) selected from those of formulae

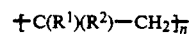   I

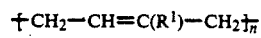   II

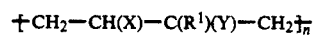   III where n is an integer within the range of from 2 to 500, $R^1$ is an alkyl group of 1 to 3 carbon atoms (more preferably methyl or ethyl), $R^2$ is H or an alkyl or alkenyl group of 1 to 3 carbon atoms (more preferably H or methyl), X is H or halogen, and Y is H or halogen.

It is further believed that the polypropylene - adherable polymer P is novel and inventive in its own right.

Accordingly there is further provided according to the invention a polypropylene-adherable polymer P which has a polymer backbone having pendant and/or terminal groups which comprise an oligomeric moiety (i.e. a sub-group) selected from those of formulae I, II, and III (as defined above).

It is also a feature of the invention that the defined coating compositions are expected to provide well-adhered coatings to some plastics substrates other than those which are polypropylene-based, and this is a further advantage of the invention.

The composition of the invention may optionally include at least one filmogenic polymer Q, not falling within the scope of polymer P (and not necessarily polypropylene-adherable), in order to enhance or supplement (as appropriate) desired properties in the applied film coating derived from the composition, such as chemical or solvent resistance, mechanical strength, and adhesiveness to subsequently applied coatings or substrates.

The at least one polymer P is usually of a filmogenic nature (i.e. film-forming when applied from the coating composition), and must be so when the composition does not contain a filmogenic polymer Q; it need not, however, be filmogenic provided at least one filmogenic polymer Q is present in the composition.

The coating composition of the invention may be an aqueous composition comprising an aqueous dispersion comprising polymer(s) P and (if present) Q. Alternatively the coating composition may be a solvent-based composition comprising a solvent-based dispersion comprising polymer(s) P and (if present) Q.

For the purposes of this invention an "aqueous dispersion" means a dispersion of the polymer(s) P and (if present) Q in an aqueous medium of which water is the principal component. Small amounts of organic liquids may optionally be present. The aqueous dispersion may e.g. be an aqueous latex of polymer(s) P and (if present) polymer(s) Q or an aqueous latex of P and (if present) an aqueous solution of Q, or an aqueous solution of both P and (if present) Q. (Therefore the term dispersion is broad enough to include solution in this specification).

By a "solvent-based dispersion" is meant a dispersion of the polymer(s) P and (if present) Q in a medium of which one or more organic liquids is the principal component, although small amounts of water may optionally be present. Preferably the solvent-based dispersion is a solution of the polymer(s) P and (if present) Q.

In compositions comprising both polymers P and Q, it is useful (though not essential) for polymer(s) P to be at least partially compatible with polymer(s) Q so as to form a homogeneous mixture therewith in the composition. By a "homogenous mixture" is meant that the aqueous or solvent-based composition contains the two polymers P and Q in a stable, uniform admixture, this uniformity remaining when the composition is left un-stirred for a period of time (as in storage).

The polypropylene-adherable polymer P may be prepared using any suitable polymerisation technique. For example, it may be an olefinic addition polymer derived from the polymerisation of at least one olefini-cally unsaturated monomer, e.g. by free-radical polymerisation, anionic polymerisation or group trans-fer polymerisation, or from the addition polymerisation of non-olefinic monomers (or monomers in which any unsaturation does not take part in the polymerisation) to form non-olefinic addition polymers such as urethane polymers or urea polymers. The polymer P may also e.g. be a condensation polymer such as a polyester or a polyamide. The polymer P could also be a polymer which is one component of a polymer system formed by polymerising the monomers for one polymer in the presence of a seed of the other, e.g. a urethane/acrylic polymer system where a urethane polymer is used as a seed for a subsequent polymerisation of acrylic mono-mers (the polymer P being either the urethane polymer or the acrylic polymer, more usually the acrylic poly-mer).

The polymer P may be formed directly by the polymerisation of at least one monomer which bears a group comprising a moiety of Formula I, Formula II, or Formula III as well as a functional group to enable it to take part in the polymerisation. This will yield a poly-mer bearing pendant groups comprising moieties of Formula I, Formula II, or Formula III or pendant and terminal groups comprising such moieties (according to the particular polymerisation employed). The polymeri-sation of at least one monomer bearing a group compris-ing a moiety of Formula I, Formula II, or Formula III may be performed without any other type of monomer or, optionally, in conjunction (copolymerisation) with at least one other monomer not bearing such a group (i.e. not comprising a moiety of Formula I, Formula II, or Formula III) although of course bearing a functional group to enable it to take part in the polymerisation. The presence of such other monomer units in the poly-mer may be required to impart or enhance desired prop-erties in the polymer such as mechanical strength, chemical or solvent resistance, or to improve the adhe-siveness of the derived coating to subsequently applied coatings, or to finely adjust (if necessary) properties in the polymer such as glass transition temperature. Gen-erally speaking, the polymer P will be made from the polymerisation of 2 to 100 weight % (more preferably 5 to 100 weight %) of monomer(s) of at least one mono-mer bearing groups comprising a moiety of Formula I, Formula II, or Formula III and correspondingly 0 to 98 weight % (more preferably 0 to 95 weight %) of at least one monomer not bearing such groups.

The functional group for enabling polymerisation to occur (to a polymer P) in a monomer having a moiety of Formula I, Formula II or Formula III is in particular a polymerisable olefinically unsaturated double bond-containing group. At least one olefinically unsaturated monomer of this type can thus, optionally in conjunc-tion (by copolymerisation) with at least one other ole-finically unsaturated comonomer (i.e. one(s) not com-prising such a moiety as defined), be polymerised to form the polymer P using techniques such as free-radi-cal polymerisation, anionic polymerisation or group transfer polymerisation. Free-radical polymerisation is widely used and convenient, although anionic polymerisation, even if less widely used, may have ad-vantages—e.g. in the production of block copolymers.

Particularly useful olefinically unsaturated double bond-containing groups (for effecting polymerisation) are (meth)acryloyl, (meth)acrylamido, and vinyl ester groups. Examples of general types or classes of polym-erisable monomers bearing such polymerisable func-tional groups as well as groups comprising moieties of Formula I, Formula II, or Formula III are as follows.

1. (Meth)acryloyl-functionalised polypropylene-chain compounds, where the moiety in question has Formula I in which $R^1 = CH_3$, $R^2 = H$ and n is 2 to 500 (so that by a "chain" is meant two or more of such polypropylene units linked together). Such a chain can be present as a monomeric chain spe-cies (i.e. not having been deliberately synthesised by a polypropylene oligomerisation) or can be an oligomeric chain species (i.e. having been deliber-ately synthesised by a polypropylene oligomerisa-tion—usually when n is large, e.g. >15.

2. (Meth)acryloyl-functionalised polyisobutylene-chain compounds, where the moiety in question has Formula I in which $R^1 = R^2 = CH_3$ and n is 2 to 500; and where, again, such a chain can be mono-meric or oligomeric in nature. An example of such a monomer (monomeric polyisobutylene chain) is tertiary octyl methacrylate:

3. Vinyl ester-functional polyisobutylene-chain com-pounds, where the moiety in question has Formula I in which $R^1 = R^2 = CH_3$ and n is 2 to 500, and where, again, such a chain can be monomeric or oligomeric in nature. An example of such a mono-mer (monomeric polyisobutylene chain) is vinyl-2,2,4,4-tetramethylpentanoate:

4. (Meth)acrylamido-functionalised polyisobutylene-chain compounds, where the moiety in question has Formula I in which $R^1 = R^2 = CH_3$ and n is 2 to 500, and where, again, such a chain can be mono-meric or oligomeric in nature. An example of such a monomer (monomeric polyisobutylene chain) is N-tertiary octyl acrylamide:

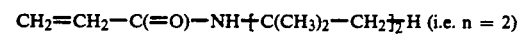

5. (Meth)acryloyl-functionalised polyisoprene-chain compounds, or the hydrogenated, halogenated, or hydrohalogenated derivatives thereof, where the moiety in question has Formula II or Formula III in which $R^1 = CH_3$ and n is 2 to 500, and where such a chain can be monomeric or oligomeric in nature (and where oligomeric is derived by 1,4-iso-prene addition).

Where the olefinically unsaturated monomer(s) bear-ing a moiety of Formula I, Formula II or Formula III is copolymerised with another type of olefinically unsaturated monomer(s) (as discussed supra), such comonomer(s) could be selected, as appropriate, from a possible list of examples which includes conjugated dienes; styrene or substituted styrenes; vinyl halides such as vinylidene chloride and vinyl chloride; olefinically unsaturated acids, anhydrides, or amides; vinyl esters; vinyl ethers; vinyl ketones; olefinically unsaturated nitriles; heterocyclic vinyl compounds; and esters of acrylic acid and methacrylic acid of formula:

$$CH_2=CR^3COOR^4$$

where $R^3$ is H or methyl and $R^4$ is optionally substituted (e.g. optionally halo or hydroxy substituted) alkyl or cycloalkyl of 1 to 20 carbon atoms (more preferably 1 to 8 carbon atoms) but which excludes moieties of Formula I. More specific examples of such monomers include acids and anhydrides such as acrylic acid, methacrylic acid, beta-carboxyethyl acrylate, fumaric acid; and maleic anhydride; (chloro)akyl esters such as methyl acrylate, ethyl acrylate, n-propyl acrylate, n-butyl acrylate, n-octyl acrylate, 2-ethylhexyl acrylate, lauryl acrylate, isopropyl acrylate, methyl alpha-chloroacrylate, ethyl alpha-chloroacrylate, n-propyl alpha-chloroacrylate, n-butyl alpha-chloroacrylate, beta-chloroethyl acrylate, beta-chloropropyl acrylate, beta-chlorobutyl acrylate, fluorinated acrylates and methacrylates (such as the fluoro analogues of the above chloroacrylates), methyl methacrylate, ethyl methacrylate, n-propyl methacrylate, isopropyl methacrylate, n-butyl methacrylate, 2-ethylhexyl methacrylate, diethyl maleate, diethyl fumarate, hydroxyethyl acrylate, hydroxyethyl methacrylate; vinyl esters such as allyl acetate, allyl chloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, o-methyl styrene, m-methyl styrene, p-methyl styrene, pentachlorostyrene, o-chlorostyrene, m-chlorostyrene, p-chlorostyrene, m-bromostyrene, p-bromostyrene, 2,5-dichlorostyrene, p-dimethylaminostyrene, p-methoxy-styrene and p-cyanostyrene; conjugated dienes or chlorodienes such as butadiene and chloroprene, vinyl-substituted heterocyclic imines such as 2-vinylpyridine and vinyl carbaxole; and vinyl ketones such as methyl vinyl ketone.

Other functional groups for enabling polymerisation to occur (to a polymer P) using a monomer having a moiety of Formula I, Formula II or Formula III include, particularly, hydroxyl, carboxyl, amino, epoxy, and isocyanate groups—these require, however, the presence of comonomers having complementary functional groups for polymerisation purposes (e.g. hydroxyl/NCO groups for polyurethane synthesis; amino/NCO groups for polyurea synthesis, carboxyl/hydroxyl groups for polyester synthesis; carboxyl/amino for polyamide synthesis)—unless of course a monomer has both types of functional groups to enable self-polymerisation to take place. Again, comonomers could be included which do not comprise moieties of Formulae I, II or III.

An example of a class of hydroxyl functionalised monomers, for taking part in a polyester or polyurethane synthesis for example, has the formula:

where n is 2 to 500 (more usually 2 to 100).

The polymer P may also be formed indirectly by way of a precursor polymer $P^1$ having functional groups distributed along its backbone and/or in terminal positions by reacting such a precursor polymer with a functionalised compound which has a group comprising a moiety of Formula I, Formula II or Formula III and which also has a functional group(s) reactable with the functional groups on the polymer backbone and/or terminal positions of $P^1$ so as to form a covalent link (via a direct bond or by an intermediate chemical group). For example the functional group (s) on the functional compound (having a moiety of Formula I, II or III) might be a hydroxy group(s) and functional groups on $P^1$ might be carboxyl (or NCO) groups, with covalent linkage occurring by ester (or urethane) formation. Alternatively, the functional group(s) on the functionalised compound might be a (meth) acryloyl group(s) and the functional groups on $P^1$ might be primary or secondary amino groups, with covalent linkage occurring by Michael addition.

In the pendant or terminal defined moiety of Formula I, $R^1$ is more preferably methyl or ethyl (and particularly methyl), and $R^2$ is more particularly H or methyl. For example: $R^1$ may be methyl with $R^2$ being H; or $R^1$ and $R^2$ may both be methyl; or $R^1$ may be ethyl with $R^2$ being methyl. For the moiety of Formula II, $R^1$ is preferably methyl. In the moeity of Formula III, $R^1$ is preferably methyl; where one or both of X and Y is halogen, this halogen is usually Cl, so that X is H and Y is Cl, or X is Cl and Y is H, or both X and Y are Cl; most preferred however if for X and Y to be H. Often n is within the range of 2 to 300, or 2 to 100. One can also consider classes of moeities where n can be large, such as >15, e.g. 15 to 500 (15 to 300), or where n can be small, such as 2 to 14, or 2 to 5, with n=2 often being used since the appropriate starting monomers are reasonably readily available.

The polypropylene-adherable polymer P may (if of a type known to be difficult to disperse in water, such as polyurethane polymers) optionally comprise backbone-pendant disperser groups which impart water-emulsifiability or water-solubility to the polymer. Such disperser groups may be ionic (usually anionic) and/or non-ionic in nature and may be introduced by any suitable technique. For example, the monomeric material used in the polymerisation to form P (or $P^1$) may include a comonomer (typically at a level of 1 to 20 wt %) providing the pendant disperser groups directly in the polymer P or providing pendant precursor disperser groups which may be subsequently converted to the disperser groups proper. Preferably the disperser groups comprise anionic groups and typically acid salt groups such as carboxylate (which can readily be incorporated by using an unsaturated carboxylic acid in the copolymerisation to form P (or $P^1$) and subsequently neutralizing at least a proportion of the backbone-pendant acid groups).

The filmogenic polymer Q is typically a non-olefinic addition polymer made from monomers which are not olefinically unsaturated (or in which any olefinic unsaturation does not take part in the polymerisation) such as a urethane polymer or the urethane polymer component of a urethane-acrylic polymer system, or a condensation polymer such as a polyester, or an olefinic addition polymer made by the addition polymerisation of olefinically unsaturated monomer(s) using free-radical polymerisation or anionic polymerisation. Examples of monomers which can be used to provide addition polymers of olefinically unsaturated monomers include conjugated dienes; styrene or substituted styrenes; vinyl halides such as vinylidene chloride and vinyl chloride; olefinically unsaturated acids, anhydrides, or amides; vinyl esters; vinyl ethers; vinyl ketones; olefinically unsaturated nitriles; heterocyclic vinyl compounds; and esters of acrylic acid and methacrylic acid of formula:

$$CH_2=CR^3COOR^4$$

where $R^3$ is H or methyl and $R^4$ is optionally substituted (e.g. optionally halo or hydroxy substituted) alkyl or cycloalkyl of 1 to 20 carbon atoms (more preferably 1 to 8 carbon atoms) but which excludes moieties of Formula I. More specific examples of such monomers include acids and anhydrides such as acrylic acid, methacrylic acid, beta-carboxyethyl acrylate, fumaric acid; and maleic anhydride; (chloro)akyl esters such as methyl acrylate, ethyl acrylate, n-propyl acrylate, n-butyl acrylate, n-octyl acrylate, 2-ethylhexyl acrylate, lauryl acrylate, isopropyl acrylate, methyl alpha-chloroacrylate, ethyl alpha-chloroacrylate, n-propyl alpha-chloroacrylate, n-butyl alpha-chloroacrylate, beta-chloroethyl acrylate, beta-chloropropyl acrylate, beta-chlorobutyl acrylate, fluorinated acrylates and methacrylates (such as the fluoro analogues of the above chloroacrylates), methyl methacrylate, ethyl methacrylate, n-propyl methacrylate, isopropyl methacrylate, n-butyl methacrylate, 2-ethylhexyl methacrylate, diethyl maleate, diethyl fumarate, hydroxyethyl acrylate, hydroxyethyl methacrylate; vinyl esters such as allyl acetate, allyl chloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, o-methyl styrene, m-methyl styrene, p-methyl styrene, pentachlorostyrene, o-chlorostyrene, m-chlorostyrene, p-chlorostyrene, m-bromostyrene, p-bromostyrene, 2,5-dichlorostyrene, p-dimethylaminostyrene, p-methoxy-styrene and p-cyanostyrene; conjugated dienes or chlorodienes such as butadiene and chloroprene, vinyl-substituted heterocyclic imines such as 2-vinylpyridine and vinyl carbaxole; and vinyl ketones such as methyl vinyl ketone.

The addition polymer for Q, may, for example, be a copolymer based on vinylidene chloride and one or more (meth)acrylate esters (as exemplified above, optionally with an unsaturated acid) or an "all-acrylic" polymer derived only from one or more of such (meth)acrylate esters (optionally with an unsaturated acid).

In many cases it is preferred that Q is a non-chlorine-containing polymer such as a urethane polymer or an all-acrylic polymer.

The polypropylene-adherable polymer P may, if Q is present in the composition, usefully have the basic backbone structure of a polymer which is at least partially compatible with the polymer Q, i.e. one able to readily coexist with Q in a blend therewith and not tend to form a inhomogeneous mixture (although this is not an essential of the invention). This is most readily achieved by P having the same types of polymeric linkages as those of polymer Q. For example, when P contains urethane linkages, Q will usefully also have the basic structure of a urethane polymer; where P is derived from (meth)acrylic polymerisation, Q will also usefully have the basic structure of a (meth)acrylic polymer, and so on.

The polypropylene-adherable polymer P may optionally also comprise functional groups reactable with optional functional groups on the polymer Q (if present) during and/or after film formation, when the carrier medium (e.g. the water medium) is being or has been removed. The integrity of the composite coating will be improved if the polymers P and Q comprise such co-reactable groups. Such a reaction could be a crosslinking reaction for example. Polymers P and Q can also have functional groups which can react with functional groups on a mutual third compound—such as a mutual crosslinker, so as to form a crosslinked network. Suitable crosslinkers include aziridines, melamines, polyisocyanates and polyepoxides.

In cases where the polymer P has copolymerised units providing backbone-pendant groups comprising moieties of Formula I, Formula II or Formula III, and also other copolymerised units not having such backbone pendant groups comprising these moieties, it is useful for such a copolymer to be a block copolymer so that the units providing the pendant moiety-containing groups (of Formula I, II or III) are arranged in blocks in the copolymer. This may allow a more effectively polypropylene adherable polymer P at a given moiety group concentration in the polymer, or an equivalent degree of polypropylene-adhesiveness at a lower level of moiety group concentration. Such block copolymerisation is readily and easily achievable when making addition polymers such as urethane polymers or condensation polymers such as polyesters. In the case of making addition copolymers derived from olefinically unsaturated comonomers, block copolymerisation may be achieved by using special anionic polymerisation techniques in which the monomers are polymerised in the presence of organolithium catalyst compounds (optionally with organoaluminium cocatalyst species). In a particularly advantageous version of this technique the organometal compounds have bulky hydrocarbyl groups linked to the metal; this allows the anionic polymerisation to be performed controllably at high (for anionic polymerisation) polymerisation temperatures (e.g. $-20°$ to $60°$ C., more usually $0°$ C. to ambient). Another method to achieve such structures is the technique known as group transfer polymerisation.

The defined chain moiety of Formula I in the polypropylene-adherable polymer P, if in the form of a long polypropylene chain, may usefully have an isotactic distribution of the polypropylene methyl groups along the chain. This may allow the polymer P to adhere more effectively to the polypropylene substrate, since most commercially-available polypropylene also has an isotactic structure. It may, however, be possible for the polymer P to have an atactic distribution of such groups along the moiety chain.

When the composition of the invention includes polymer of the type Q, the polymers P and Q may be brought together in any appropriate manner. For example, preformed polymers P and Q may simply be blended, as the polymerisation to form polymer P may be performed in the presence of preformed polymer Q, as the polymerisation to form polymer Q may be performed in the presence of preformed polymer P.

The composition of the invention may, as explained supra, be readily applied to an untreated polypropylene substrate, although this does not of course preclude it being applied to a substrate that has been treated.

The coating composition may be employed as a decorative or protective coating in its own right, or may be employed to provide a primer coating prior to the application of one or more further coatings (e.9. paint coatings or adhesive coatings). In the latter case, it is obviously desirable that the filmogenic polymer Q (if present) should be properly adherable to the polymer(s) of the subsequently applied coating, and may readily be selected with this in mind; if Q is absent, the same comments apply to P.

The polypropylene-adherable polymer P preferably comprises a level of pendant and/or terminal chain moiety (as defined) which is within the range of from 1 to 70 weight %, more preferably 2 to 60 weight %, and particularly 5 to 50 weight %, based on solid content.

The coating composition of the invention (when Q is present) suitably has a weight ratio of at least one polymer P to at least one polymer Q within the range of between 1/1000 to 1000/1, preferably 1/9 to 99/1, more preferably 1/5 to 20/1.

The coating composition of the invention typically has a polymer solids content of from about 10% to 75% by weight, more usually 20% to 60% by weight. The number average molecular weight $M_n$ of polymer Q (if present) is typically within the range of from 4,000 to 3,000,000 or over, and that of polymer P typically within the range of from 5,000 to over 1,000,000.

The composition of the invention may include, or be subsequently formulated with, various other ingredients. For example, it may if desired include, or subsequently be formulated with, ingredients commonly employed in film-forming coating formulations such as defoamers, rheology control agents, thickeners, dispersing and stabilizing agents (usually surfactants), wetting agents, fillers, extenders, fungicides, coalescing solvents, cosolvents, plasticisers, anti-freeze agents and pigments. For many applications, it is envisaged that the composition will be in the form of, or will subsequently be used in a formulation to provide, a paint, and will therefore include materials commonly employed in paint formulations, such as pigments and other ingredients where appropriate (extenders, stabilisers, thickeners, coalescing solvents, defoamers, surfactants, and so on).

The composition of the invention may be applied to a polypropylene substrate (or any other plastics substrate if suitable) by any suitable technique, e.g. brush, spray, roller, dipping or spreading with a knife or rod, and removing the carrier medium (solvent and/or water) by natural or accelerated drying (e.g. in an oven).

The present invention is now illustrated by reference to the following examples. Unless otherwise specified, all parts, percentages and ratios are on a weight basis.

In these examples, coating compositions according to the invention are coated onto polypropylene substrates and tested for adhesion thereto.

The polypropylene substrates employed were commercially-available polypropylene homo- or copolymers in the form of plaques as follows:

| | |
|---|---|
| Plaque 1: | pure polypropylene (homopolymer) consisting of 2 mm thick stereoregular polypropylene (M A Vink Kunstoffen b.v.) |
| Plaque 2: | polypropylene copolymer (Dutch State Mines) |
| Plaque 3: | polypropylene toughened with poly(ethylene/propylene/diene) (Himond PP-EPDM, Moplane SP 35) |
| Plaque 4: | polypropylene toughened with poly(ethylene/propylene/diene) (Hoechst PP-EPDM, Hostalen) |

The polypropylene plaques of whatever composition were all degreased prior to coating by wiping with a tissue soaked in a 1:1 mixture of isopropyl alcohol and constant boiling gasoline 80°-110° C. fraction. The polymer samples in the coating compositions were admixed with various co-solvents, thickeners etc to achieve appropriate viscosities, levelling and wetting behaviour.

Film coatings were applied by a wire-wound rod such that the dry coating thickness was between 35 and 45 μm. The coated plaques were baked in an oven for 30 minutes at 80° C. and left to cool for about 14 hours before testing for coating adhesion.

The following methods of assessing adhesion were employed in these examples.

GITTERSCHNITT TEST

The coating is crosshatched with a sharp knife so as to produce squares approximately 1 mm×1 mm. A standard cellulosic tape is firmly and uniformly applied over the crosshatched area and then firmly pulled away at an angle of 180 to the substrate surface. The crosshatch is examined to assess how much coating has been pulled away, and a rating awarded as follows.

| | |
|---|---|
| GT-0 | The crosshatched coating is completely free from damage. |
| GT-1 | 5% of the coating has been pulled away. |
| GT-2 | 15% of the coating has been pulled away. |
| GT-3 | 35% of the coating has been pulled away. |
| GT-4 | 65% of the coating has been pulled away. |
| GT-5 | Complete loss of the coating. |

CROSS TEST

This test involves cutting a cross in the coating such that the lines intersect at an angle of approximately 70°. An attempt is then made to lift the coating at the intersection with a sharp knife. This should prove impossible if a good adhesion result is to be recorded. The result is graded "NL" if adhesion is maintained and "L" if it is lost.

The ability of a coating to maintain adhesion after it has been subjected to a resistance test can also be examined. The coated plaque should be dipped in water at 32° C. for up to 10 days and the adhesion tests repeated, having first allowed the coating a 30 minute recovery period after removing from the water.

EXAMPLE 1

A coating composition according to the invention was prepared as follows.

N-tertiary octyl acrylamide (TOA; 250.0 g) and benzoyl peroxide (75% in water; 2.1 g) were dissolved in toluene (250.0 g) using a flask equipped with a thermometer, stirrer and condenser. The temperature of the flask contents was raised to 75°-80° C., and kept at this level throughout the reaction. After 1 hour, further benzoyl peroxide (75% in water; 2.1 g) was added, followed by more benzoyl peroxide (75% in water; 2.1 g) 30 minutes later. After a further 30 minutes, azobisisobutyronitrile (AIBN; 2.1 g) was added, and after a final 30 minutes at 75°–80° C., the reaction medium was cooled to ambient temperature, to give a solution of high viscosity.

A portion of this solution was blended with xylene (3 parts diluent to 1 part solution) to reduce the viscosity, and the adhesion tests carried out as described above. The following ratings were found.

|  | Plaque 1 | Plaque 2 | Plaque 3 | Plaque 4 |
|---|---|---|---|---|
| Gitterschnitt (dry) | Gt-0 | Gt-0 | Gt-0 | Gt-0 |
| Cross (dry) | NL | NL | NL | NL |
| Appearance, 5 day soak | Clear | Clear | Clear | Clear |
| Gitterschnitt, 10 day soak | Gt-0 | Gt-0 | Gt-0 | Gt-0 |
| Cross, 10 day soak | NL | NL | NL | NL |

EXAMPLE 2

A coating composition according to the invention was prepared using the same procedure as in Example 1, except that instead of TOA alone, 237.5 g of TOA and 12.5 of isodecyl acrylate were used. The Gitterschnitt adhesion test (dry) was carried out on pure polypropylene (plaque type 1); this was rated as Gt-0.

EXAMPLE 3

A coating composition according to the invention was prepared as follows.

Water (demin; 248.0 g), Na$_2$SO$_4$ (0.37 g) and Acrysol A-1 (protective colloid; 0.60 g) were added to a flask equipped with a thermometer, stirrer and condenser. The following components were first blended together in a separate beaker: lauryl acrylate (19.0 g), methyl methacrylate (19.0 g), TOA (60.0 g), methacrylic acid (2.0 g), lauroyl peroxide (0.70 g) and n-dodecylmercaptan (0.33 g). This blend was added to the reaction flask. The temperature of the flask contents was raised to 82° C. (±1° C.). After 15 minutes, Surfagene FAZ 109 V (anionic surfactant of phosphate ester type; 20% solids; 3.5 g) was added. After 75 minutes (or when the beads were hard), the temperature was raised to 90° C. (±2° C.); this temperature was held for 20 minutes, and the reactor contents were then cooled.

The resulting beads were sieved from the aqueous phase and washed thoroughly with water before preliminary drying in a centrifuge and subsequent complete drying in an oven at 52° C. for 14 hours.

To form a coating composition according to the invention 30 g of the beads were dissolved in 70 g of toluene, and the Gitterschnitt adhesion performance (dry) assessed by coating on to pure polypropylene (plaque type 1); this was rated as Gt-0.

EXAMPLE 4

A coating composition according to the invention was prepared as follows.

Water (demin; 991.12 g), Na$_2$SO$_4$ (1.40 g), and Acrysol A-1 (protective colloid; 5.60 g) were added to a reactor equipped with a thermometer, stirrer and condenser. The following components were blended together: lauroyl peroxide (11.20 g), lauryl mercaptan (1.40 g), and a commercially-available mixture of isomeric vinyl esters (560.00 g), consisting predominantly of the isomer vinyl-2,2,4,4-tetramethylpentanoate of structure:

The blend was added to the reactor, rinsing the blending vessel with water (demin; 50.00 g). The temperature of the reactor contents was raised to 70° C.±1° C. After 15 minutes, Airvol 540 (protective colloid of the polyvinyl alcohol type; 0.289) and water (demin: 15.00 g) were added. The temperature was raised to 85° C.±1° C. for 1 hour (or until the beads were hard). The reactor contents were then cooled, and the resulting polymer beads sieved from the aqueous phase, washed thoroughly with water and given a preliminary drying in a centrifugal, follwed by 14 hours in an oven at 52° C.

A solution [30% by weight in toluene] of this polymer was used as the coating composition and the Gitterschitt adhesion performance (dry) assessed by coating onto pure polypropylene (plaque type 1); this was rated as Gt-0.

EXAMPLE 5

A coating composition not according to the invention was prepared as follows:

Water (demin; 144.292 g), sodium lauryl sulphate (30%; 8.333 g), ammonium persulphate (0.5 g) were added to a reactor flask equipped with a thermometer, stirrer and condenser. The following components were blended together: 2-ethylhexyl acrylate (60 g), methyl methacrylate (38 g), and methacrylic acid (2 g). This blend was added to the reactor over 1 hour. The temperature of the reactor contents was raised to 90° C. (±2° C.) and maintained at this temperature for 0.5 hours. The resulting polymer latex was cooled and pased through a sieve to remove oversized particles.

The resulting latex was used as a coating composition (with the addition of 35% cyclohexane, based on polymer content, as cosolvent) and the Gitterschnitt adhesion performance (dry) assessed by coating onto pure polypropylene (plaque type 1); this was rated as Gt-5.

We claim:

1. Film-forming coating composition for application to a polypropylene based substrate, which coating composition comprises at least one polypropylene-adherable polymer P which has a polymer backbone having pendant groups which comprise a moiety selected from those of formula

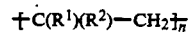   I

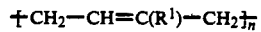   II

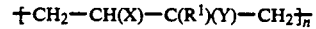   III where n is an integer within the range of from 2 to 500, R$^1$ is an alkyl group of 1 to 3 carbon atoms, R$^2$ is H or an alkyl or alkenyl group of 1 to 3 carbon atoms, X is H, and Y is H.

2. Coating composition according to claim 1 wherein R$^1$ is methyl or ethyl.

3. Coating composition according to either claim 1 or claim 2 wherein R$^2$ is H or methyl.

4. Coating composition according to any one of the preceding claims wherein in the moiety of Formula I, R$^1$ is methyl and R$^2$ is H or methyl.

5. Coating composition according to any one of claims 1 to 3 wherein in the moiety of Formula II, $R^1$ is methyl.

6. Coating composition according to any one of claims 1 to 3 wherein in the moiety of Formula III, $R^1$ is methyl and X and Y are both H.

7. Coating composition according to any one of the preceding claims wherein said at least one polymer P is a filmogenic polymer.

8. Coating composition according to any one of the preceding claims wherein said at least one polymer P is a polymer that has been formed directly by the polymerisation of at least one monomer which bears a group comprising a moiety of Formula I, Formula II and Formula III as well as a functional group for enabling it to take part in the polymerisation.

9. Coating composition according to claim 8 wherein the polymerisation to form polymer P is performed by polymerising only at least one monomer bearing a group comprising a moiety of Formula I, Formula II, or Formula III and a functional group for enabling it to take part in the polymerisation.

10. Coating composition according to claim 8 wherein the polymerisation to form polymer P is performed by polymerising at least one monomer bearing a group comprising a moiety of Formula I, Formula II, or Formula III and a functional group for enabling it to take part in the polymerisation, and at least one monomer bearing a functional group for enabling it to take part in the polymerisation but not bearing a group comprising a moiety of Formula I, Formula II or Formula III.

11. Coating composition according to any one of claims 8 to 10 wherein the functional group(s) for enabling polymerisation to occur in a monomer having a group comprising a moiety of Formula I, Formula II, or Formula III, is an olefinically unsaturated double bond-containing group and the polymer P is an addition polymer derived from the polymerisation of at least said at least one olefinically-unsaturated monomer.

12. Coating composition according to claim 11 wherein said olefinically unsaturated double bond-containing group(s) is selected from acryloyl, methacryloyl, acrylamido, methacrylamido, and vinyl ester groups.

13. Coating composition according to either claim 11 or 12 wherein said olefinically unsaturated monomer bearing a group comprising a moiety of Formula I, Formula II, or Formula III and a functional group for taking part in the polymerisation is a polypropylene chain compound where the moiety in question has Formula I in which $R^1$ is methyl, $R^2$ is H and n is 2 to 500.

14. Coating composition according to either claim 11 or 12 wherein said olefinically unsaturated monomer bearing a group comprising a moiety of Formula I, Formula II, or Formula III and a functional group for enabling it to take part in the polymerisation is a polyisobutylene-chain compound where the moiety in question has Formula I in which $R^1$ and $R^2$ are both methyl and n is 2 to 500.

15. Coating composition according to claim 14 wherein said monomer is tertiary octyl methacrylate, N-tertiary octyl acrylamide, or vinyl-2,2,4,4-tetramethylpentanoate.

16. Coating composition according to either claim 11 or claim 12 wherein said olefinically unsaturated monomer bearing a group comprising moiety of Formula I, Formula II, or Formula III and a functional group for enabling it to take part in the polymerisation is a polyisoprene-chain compound, or the hydrogenated, halogenated, or hydrohalogenated derivative thereof where the moiety in question has Formula II or Formula III in which $R^1$ is $CH_3$ and n is 2 to 500.

17. Coating composition according to any one of claims 11 to 16 wherein said polymer P is an addition polymer derived from the polymerisation of said at least one olefinically-unsaturated monomer bearing a group comprising a moiety of Formula I, Formula II, or Formula III and at least one other olefinically unsaturated monomer not bearing such a group.

18. Coating composition according to claim 17 wherein said at least one other olefinically unsaturated monomer is selected from conjugated dienes; styrene or substituted styrenes; vinyl halides; olefinically unsaturated acids, anhydrides or amides; vinyl esters; vinyl ethers; vinyl ketones; olefinically unsaturated nitriles; heterocyclic vinyl compounds, and esters of acrylic acid and methacrylic acid of formula $CH_2=CR^3COOR^4$ where $R^3$ is H or methyl and $R^4$ is optionally substituted alkyl or cycloalkyl of 1 to 20 carbon atoms.

19. Coating composition according to any one of claims 8 to 10 wherein the functional group(s) for enabling polymerisation to occur in a monomer having a group comprising a moiety of Formula I, Formula II, or Formula III, is a group(s) selected from hydroxyl, carboxyl, amino, epoxy and isocyanate groups and the polymer P is a non-olefinic addition polymer or a condensation polymer.

20. Coating composition according to claim 19 wherein said polymer P is a urethane polymer, a urea polymer, a polyester or a polyamide.

21. Coating composition according to claim 20 wherein said monomer is one having the formula $(OH)_2CH-[C(CH_3)H-CH_2]_n-CH_3$ where n is 2 to 500.

22. Coating composition according to any one of claims 1 to 7 wherein said at least one polymer P is a polymer that has been formed indirectly by first forming a precursor polymer $P^1$ having functional groups distributed along its backbone and/or in terminal positions and reacting this precursor polymer with a functionalised compound which has a group comprising a moiety of Formula I, Formula II, or Formula III and which also has a functional group(s) reactable with the functional groups on the backbone and/or terminal positions of $P^1$ so as to form a covalent link(s).

23. Coating composition according to any one of the preceding claims wherein said composition additionally includes at least one filmogenic polymer Q not falling within the scope of polymer P.

24. Coating composition according to claim 23 wherein said polymer Q is a non-olefinic addition polymer, a condensation polymer, or an olefinic addition polymer made by the addition polymerisation of at least one olefinically unsaturated monomer.

25. Coating composition according to either claim 23 or claim 24 wherein polymer P has the same type of polymeric linkages as those of polymer Q.

26. Coating composition according to any one of claims 23 to 25 wherein the polymers P and Q have coreactable groups which can react with each other or with a mutual third compound during and/or after film formation from the composition.

27. Coating composition according to any one of the preceding claims wherein said composition comprises a solvent-based dispersion comprising said at least one polymer P and, if present, said at least one polymer Q.

28. Coating composition according to any one of claims 1 to 26 wherein said composition comprises an aqueous-based dispersion comprising said at least one polymer P, if present, said at least one polymer Q.

29. Polypropylene-adherable polymer P which has a polymer backbone having pendant groups which comprise a moiety selected from those of formulae

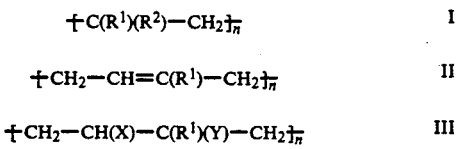

where n is an integer within the range of from 2 to 500, $R^1$ is an alkyl group of 1 to 3 carbon atoms, $R^2$ is H or an alkyl or alkenyl group of 1 to 3 carbon atoms, X is H, and Y is H.

30. Polymer according to claim 29 wherein $R^1$ is methyl or ethyl.

31. Polymer according to either claim 29 or claim 30 wherein $R^2$ is H or methyl.

32. Polymer according to any one of claims 29 to 31 wherein in the moiety of Formula I, $R^1$ is methyl and $R^2$ is H or methyl.

33. Polymer according to any one of claims 29 to 31 wherein in the moiety of Formula II, $R^1$ is methyl.

34. Polymer according to any one of claims 29 to 31 wherein in the moiety of Formula III, $R^1$ is methyl and X and Y are both H.

35. Polymer according to any one of claims 29 to 34 wherein said at least one polymer P is a filmogenic polymer.

36. Polymer according to any one of claims 29 to 35 wherein said at least one polymer P is a polymer that has been formed directly by the polymerisation of at least one monomer which bears a group comprising a moiety of Formula I, Formula II and Formula III as well as a functional group for enabling it to take part in the polymerisation.

37. Polymer according to claim 36 wherein the polymerisation to form polymer P is performed by polymerising only at least one monomer bearing a group comprising a moiety of Formula I, Formula II, or Formula III and a functional group for enabling it to take part in the polymerisation.

38. Polymer according to claim 36 wherein the polymerisation to form polymer P is performed by polymerising at least one monomer bearing a group comprising a moiety of Formula I, Formula II, or Formula III and a functional group for enabling it to take part in the polymerisation, and at least one monomer bearing a functional group for enabling it to take part in the polymerisation but not bearing a group comprising a moiety of Formula I, Formula II or Formula III.

39. Polymer according to any one of claims 36 to 38 wherein the functional group(s) for enabling polymerisation to occur in a monomer having a group comprising a moiety of Formula I, Formula II, or Formula III, is an olefinically unsaturated double bond-containing group and the polymer P is an addition polymer derived from the polymerisation of at least said at least one olefinically-unsaturated monomer.

40. Polymer according to claim 29 wherein said olefinically unsaturated double bond-containing group(s) is selected from acryloyl, methacryloyl, acrylamido, methacrylamido, and vinyl ester groups.

41. Polymer according to either claim 39 or claim 40 wherein said olefinically unsaturated monomer bearing a group comprising a moiety of Formula I, Formula II, or Formula III and a functional group for taking part in the polymerisation is a polypropylene chain compound where the moiety in question has Formula I in which $R^1$ is methyl, $R^2$ is H and n is 2 to 500.

42. Polymer according to either claim 39 or claim 40 wherein said olefinically unsaturated monomer bearing a group comprising a moiety of Formula I, Formula II, or Formula III and a functional group for enabling it to take part in the polymerisation is a polyisobutylene-chain compound where the moiety in question has Formula I in which $R^1$ and $R^2$ are both methyl and n is 2 to 500.

43. Polymer according to claim 42 wherein said monomer is tertiary octyl methacrylate, N-tertiary octyl acrylamide, or vinyl-2,2,4,4-tetramethylpentanoate.

44. Polymer according to either claim 39 or claim 40 wherein said olefinically unsaturated monomer bearing a group comprising a moiety of Formula I, Formula II, or Formula III and a functional group for enabling it to take part in the polymerisation is a polyisoprene-chain compound, or the hydrogenated, halogenated, or hydrohalogenated derivative thereof where the moiety in question has Formula II or Formula III in which $R^1$ is $CH_3$ and n is 2 to 500.

45. Polymer according to any one of claims 29 to 44 wherein said polymer P is an addition polymer derived from the polymerisation of said at least one olefinically-unsaturated monomer bearing a group comprising a moiety of Formula I, Formula II, or Formula III and at least one other olefinically unsaturated monomer not bearing such a group.

46. Polymer according to claim 45 wherein said at least one other olefinically unsaturated monomer is selected from conjugated dienes; styrene or substituted styrenes; vinyl halides; olefinically unsaturated acids, anhydrides or amides; vinyl esters; vinyl ethers; vinyl ketones; olefinically unsaturated nitriles; heterocyclic vinyl compounds, and esters of acrylic acid and methacrylic acid of formula $CH_2=CR^3COOR^4$ where $R^3$ is H or methyl and $R^4$ is optionally substituted alkyl or cycloalkyl of 1 to 20 carbon atoms.

47. Polymer according to any one of claims 36 to 38 wherein the functional group(s) for enabling polymerisation to occur in a monomer having a group comprising a moiety of Formula I, Formula II, or Formula III, is a group(s) selected from hydroxyl, carboxyl, amino, epoxy and isocyanate groups and the polymer P is a non-olefinic addition polymer or a condensation polymer.

48. Polymer according to claim 47 wherein said polymer P is a urethane polymer, a urea polymer, a polyester or a polyamide.

49. Polymer according to claim 48 wherein said monomer is one which has the formula $(OH)_2CH{\dashv}C(CH_3)H{-}CH_2{\dashv}_n{-}CH_3$ where n is 2 to 500.